US010937311B2

(12) United States Patent
Park

(10) Patent No.: US 10,937,311 B2
(45) Date of Patent: Mar. 2, 2021

(54) TRAFFIC INFORMATION SERVICE SYSTEM AND METHOD

(71) Applicants: HYUNDAI MOTOR COMPANY, Seoul (KR); KIA MOTORS CORPORATION, Seoul (KR)

(72) Inventor: Sung Hwan Park, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/599,926

(22) Filed: Oct. 11, 2019

(65) Prior Publication Data

US 2021/0012651 A1 Jan. 14, 2021

(30) Foreign Application Priority Data

Jul. 8, 2019 (KR) .......................... 10-2019-0082052

(51) Int. Cl.
*G08G 1/01* (2006.01)
*H04L 29/08* (2006.01)

(52) U.S. Cl.
CPC ......... *G08G 1/0141* (2013.01); *G08G 1/0112* (2013.01); *G08G 1/0129* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 8,180,558 B1* | 5/2012 | Marko | .................. | G08G 1/012 |
| | | | | 701/119 |
| 9,558,660 B1* | 1/2017 | Fowe | .................. | G08G 1/0133 |
| 10,008,110 B1* | 6/2018 | Herlocker | ............ | G08G 1/0129 |
| 10,091,675 B2* | 10/2018 | Cheng | .................. | H04W 24/08 |
| 10,397,244 B2* | 8/2019 | Toyama | ............... | G08G 1/0129 |
| 2005/0216147 A1* | 9/2005 | Ferman | .................. | G08G 1/127 |
| | | | | 701/409 |
| 2007/0189181 A1* | 8/2007 | Kirk | ........................ | H04L 67/12 |
| | | | | 370/252 |
| 2007/0208495 A1* | 9/2007 | Chapman | ............. | G08G 1/0112 |
| | | | | 701/117 |
| 2009/0182492 A1* | 7/2009 | Alten | .................. | G01C 21/3484 |
| | | | | 701/532 |
| 2010/0063715 A1* | 3/2010 | Wynter | .............. | G01C 21/3691 |
| | | | | 701/118 |
| 2010/0097240 A1* | 4/2010 | Soulchin | ............ | G01C 21/3691 |
| | | | | 340/905 |
| 2011/0264511 A1* | 10/2011 | Zhang | .................. | G06Q 30/02 |
| | | | | 705/14.43 |

(Continued)

FOREIGN PATENT DOCUMENTS

KR 10-2018-0013367 A 2/2018

*Primary Examiner* — Curtis J King
(74) *Attorney, Agent, or Firm* — Brinks Gilson & Lione

(57) ABSTRACT

A system and a method for providing traffic information and includes: a database storing and managing traffic pattern information based on past traffic information; and a server that computes a real-time link entry time based on a real-time link speed received from a probe vehicle, corrects the traffic pattern information based on the real-time link speed and the real-time link entry time, and predicts and provide real-time traffic information based on the corrected traffic pattern information.

9 Claims, 8 Drawing Sheets

(56) References Cited

U.S. PATENT DOCUMENTS

| | | | | |
|---|---|---|---|---|
| 2011/0282627 | A1* | 11/2011 | Jang | G08G 1/0112 702/179 |
| 2012/0173530 | A1* | 7/2012 | Kurciska | G08G 1/0112 707/738 |
| 2012/0283942 | A1* | 11/2012 | T'Siobbel | G01C 21/26 701/410 |
| 2013/0173153 | A1* | 7/2013 | Hayashida | G08G 1/096811 701/527 |
| 2014/0032088 | A1* | 1/2014 | Chang | G08G 1/0133 701/117 |
| 2014/0032091 | A1* | 1/2014 | Arcot | G08G 1/0129 701/119 |
| 2014/0201121 | A1* | 7/2014 | Jones | G06N 5/02 706/46 |
| 2014/0266798 | A1* | 9/2014 | Witte | G08G 1/0112 340/907 |
| 2015/0120174 | A1* | 4/2015 | Lewis | G08G 1/0112 701/118 |
| 2015/0228188 | A1* | 8/2015 | Macfarlane | G08G 1/0129 340/936 |
| 2015/0262477 | A1* | 9/2015 | Fowe | G08G 1/096716 701/118 |
| 2015/0312327 | A1* | 10/2015 | Fowe | G01C 21/26 701/23 |
| 2016/0055744 | A1* | 2/2016 | Branson | G08G 1/0112 340/916 |
| 2016/0125734 | A1* | 5/2016 | Stenneth | G08G 1/0112 340/935 |
| 2016/0153804 | A1* | 6/2016 | Fowe | G08G 1/0141 701/118 |
| 2016/0275404 | A1* | 9/2016 | Abraham | G06Q 10/20 |
| 2016/0275786 | A1* | 9/2016 | Fowe | G08G 1/0141 |
| 2016/0293006 | A1* | 10/2016 | Bauer | G08G 1/0962 |
| 2016/0321919 | A1* | 11/2016 | Xu | G08G 1/0112 |
| 2016/0364983 | A1* | 12/2016 | Downs | G08G 1/0141 |
| 2016/0379488 | A1* | 12/2016 | Fowe | G01C 21/30 701/119 |
| 2016/0379489 | A1* | 12/2016 | Macfarlane | G08G 1/0141 701/119 |
| 2017/0004705 | A1* | 1/2017 | Fowe | G01C 21/3658 |
| 2017/0023945 | A1* | 1/2017 | Cavalcanti | G08G 1/0141 |
| 2017/0186314 | A1* | 6/2017 | Bernhardt | G08G 1/0133 |
| 2017/0191834 | A1* | 7/2017 | Fowe | G01C 21/10 |
| 2017/0309172 | A1* | 10/2017 | Linder | G08G 1/0141 |
| 2017/0323563 | A1* | 11/2017 | Pundurs | G08G 1/052 |
| 2017/0337810 | A1* | 11/2017 | Abe | G01C 21/3492 |
| 2018/0033296 | A1* | 2/2018 | Fowe | G01C 21/3415 |
| 2018/0033297 | A1* | 2/2018 | Fowe | G08G 1/012 |
| 2018/0122227 | A1* | 5/2018 | Mubarek | G08B 21/18 |
| 2018/0122229 | A1* | 5/2018 | Mubarek | G08G 1/096844 |
| 2018/0174447 | A1* | 6/2018 | Pellolio | G08G 1/0129 |
| 2018/0240026 | A1* | 8/2018 | Pietrobon | G08G 1/0141 |
| 2018/0276988 | A1* | 9/2018 | Littlejohn | G08G 1/0116 |
| 2018/0286220 | A1* | 10/2018 | Fowe | G08G 1/0141 |
| 2018/0364063 | A1* | 12/2018 | Dorum | G01C 21/3685 |
| 2019/0103019 | A1* | 4/2019 | Fowe | G01S 19/42 |
| 2019/0122541 | A1* | 4/2019 | Fowe | G08G 1/0133 |
| 2019/0189001 | A1* | 6/2019 | Smothers | G01C 21/34 |
| 2019/0251838 | A1* | 8/2019 | Bernhardt | G08G 1/0145 |
| 2019/0279502 | A1* | 9/2019 | Fowe | G08G 1/0141 |
| 2019/0364492 | A1* | 11/2019 | Azizi | H04W 4/029 |
| 2019/0383626 | A1* | 12/2019 | Fowe | G08G 1/0112 |
| 2020/0072631 | A1* | 3/2020 | Fowe | G01C 21/32 |
| 2020/0073966 | A1* | 3/2020 | Fowe | G01C 21/3658 |
| 2020/0135022 | A1* | 4/2020 | Xu | G08G 1/0112 |

* cited by examiner

TRAFFIC INFORMATION SERVICE SYSTEM AND METHOD

CROSS-REFERENCE TO RELATED APPLICATION

This application claims priority to and the benefit of Korean Patent Application No. 10-2019-0082052, filed on Jul. 8, 2019, the entire contents of which are incorporated herein by reference.

FIELD

The present disclosure relates to a system and a method for providing traffic information.

BACKGROUND

The statements in this section merely provide background information related to the present disclosure and may not constitute prior art.

Generally, a traffic information providing system provides current traffic information based on real-time traffic information (traffic information collected in real time,) or predicts and provides current traffic information, using precollected past traffic information. The traffic information providing system collects traffic information through a probe vehicle in real time. Because the probe vehicle may determine traffic information about any direction (straight, left-turn, right-turn, or the like) after the time of passing through a link, the probe vehicle collects the traffic information at a point in time when the probe vehicle passes through the link.

We have discovered that it takes a long time to detect congestion in the link, when the link is long, and, because real-time traffic information is provided based on the traffic information at the time of passing through the link, the congestion may not be reflected to the real-time traffic information even though the congestion occurs in the corresponding link before the probe vehicle passes through the link. Accordingly, it is impossible to provide accurate traffic information.

SUMMARY

An aspect of the present disclosure provides a system and a method for providing traffic information that may rapidly recognize congestion in a link, using traffic pattern information based on precollected traffic information to provide real-time traffic information.

Moreover, an aspect of the present disclosure provides a system and a method for providing real-time traffic information of a following link by reflecting traffic conditions of a preceding link.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a traffic information providing system includes: a database storing and managing traffic pattern information based on past traffic information; and a server including a memory and a processor configured to execute instructions stored in the memory. The processor of the server is configured to: compute a real-time link entry time based on a real-time link speed received from a probe vehicle, correct the traffic pattern information based on the real-time link speed and the real-time link entry time, and predict and provide real-time traffic information based on the corrected traffic pattern information.

The server calculates a past link driving time based on a past link speed in the past traffic information, computes a past link entry time, using the past link driving time, and reprocesses the past traffic information based on the past link entry time to generate the traffic pattern information.

The past traffic information is generated based on probe data precollected through the probe vehicle.

The server calculates a real-time link driving time, using the real-time link speed and computes the real-time link entry time based on a real-time link exit time and the real-time link driving time.

The server matches the real-time link exit time to the traffic pattern information to extract a pattern link speed and computes a speed difference between the real-time link speed and the pattern link speed.

The server corrects the traffic pattern information by reflecting the real-time link entry time and the speed difference.

The server matches the real-time link entry time to the traffic pattern information and extracts a pattern link speed after a pattern link entry time to reflect the speed difference.

The server selects a lane link, of which a link speed in a link set for each lane in a preceding road section is not greater than a first reference speed, determines whether a link speed of a lane link in a following road section connected to the selected lane link is not less than a second reference speed, and determines whether a difference between a lowest link speed and a highest link speed of the lane link in the following road section is not less than a third reference speed within a predetermined time based on a current time, when the link speed of the lane link in the following road section is not less than the second reference speed.

The server matches the current time to the traffic pattern information to reflect a lowest pattern link speed among pattern link speeds within the predetermined time based on the current time, to a link speed of the following road section in advance, when the difference between the lowest link speed and the highest link speed of the lane link in the following road section is not less than the third reference speed.

According to another aspect of the present disclosure, a traffic information providing method includes: generating, by a processor, traffic pattern information based on past traffic information; receiving a real-time link speed from a probe vehicle; computing, by the processor, a real-time link entry time based on the real-time link speed; correcting, by the processor, the traffic pattern information based on the real-time link speed and the real-time link entry time; and predicting and providing, by the processor, real-time traffic information based on the corrected traffic pattern information.

The generating of the traffic pattern information includes: calculating a past link driving time, using a past link speed in the past traffic information; calculating a past link entry time by utilizing the past link driving time; and reprocessing the past traffic information based on the past link entry time again to generate the traffic pattern information.

The computing of the real-time link entry time includes calculating a real-time link driving time based on the real-time link speed and estimating the real-time link entry time, using the real-time link driving time and a real-time link exit time.

The correcting of the traffic pattern information includes calculating a speed difference between the real-time link speed and a pattern link speed, based on a real-time link exit time and correcting the traffic pattern information by reflecting the real-time link entry time and the speed difference.

The calculating of the speed difference includes matching the real-time link exit time to the traffic pattern information to extract the pattern link speed and calculating the speed difference by subtracting the pattern link speed from the real-time link speed.

The correcting of the traffic pattern information by reflecting the real-time link entry time and the speed difference includes extracting the pattern link speed matched to the real-time link entry time, from the traffic pattern information, calculating a link speed of the real-time link entry time by reflecting the speed difference to the extracted pattern link speed, and generating the real-time traffic information by reflecting the calculated link speed to the real-time link speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
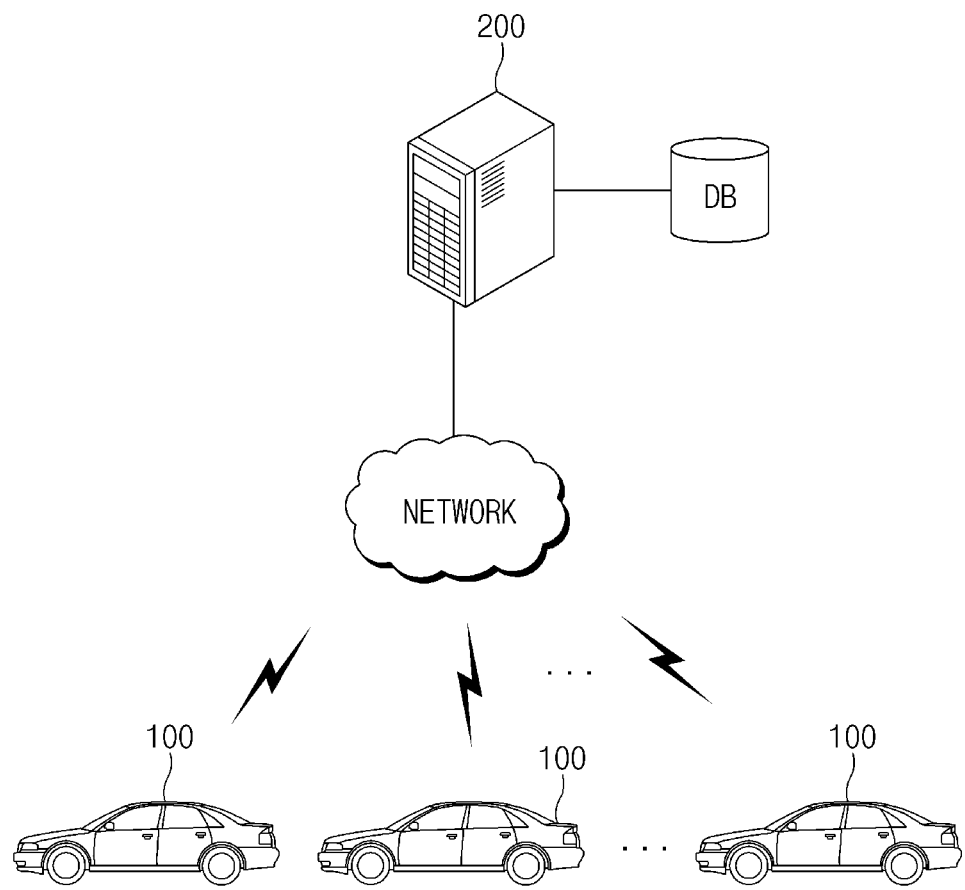
FIG. 1 is a configuration diagram illustrating a traffic information providing system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this specification, a link refers to a line connecting between a node and another node and is generated at a point such as a road, a bridge, an overpass, an underground roadway, and/or a tunnel. Herein, a node refers to a point at which the change of the speed occurs while a vehicle is driving on a road, such as an intersection, the starting point of a bridge, the starting point of an overpass, the starting point of a road, the starting point of an underground roadway, the starting point of a tunnel, an administrative boundary, interchange (IC) and/or junction (JC). The link may be used as the meaning such as a road section and may be generated for each direction of traffic flow. For example, each of a straight link, a left-turn link and a right-turn link are generated with respect to the same road section; alternatively, the first lane link, the second lane link, and the third lane link may be generated with respect to the same road section.

The present disclosure is to provide real-time traffic information by rapidly recognizing (detecting) congestion when the congestion occurs in a link (road section). The present disclosure may generate traffic pattern information based on a link entry time, using past traffic information, may monitor traffic conditions of a preceding road section, may apply the traffic conditions to the traffic information of a following road section, and thus may provide accurate traffic information.

Figure 2:
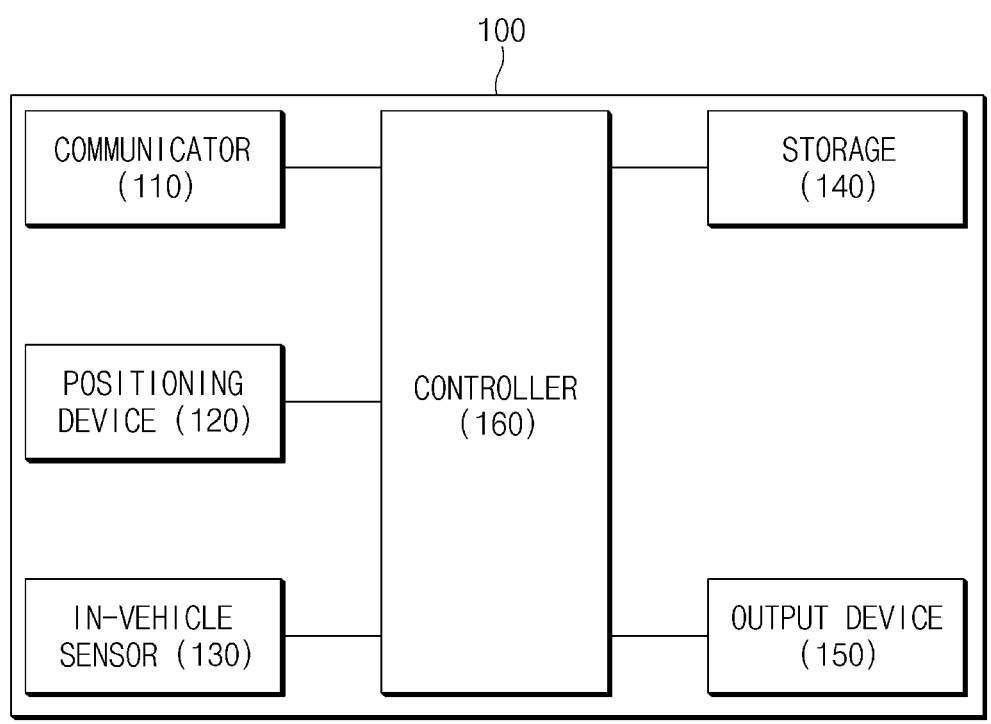
FIG. 2 is a block diagram illustrating a probe vehicle 100 illustrated in FIG. 1.
Figure 3:
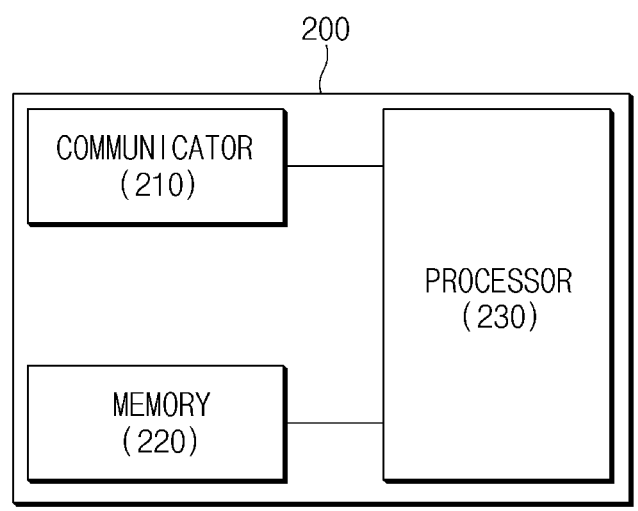
FIG. 3 is a block diagram illustrating a server 200 illustrated in FIG. 1.

FIG. 1 is a configuration diagram illustrating a traffic information providing system, according to one form of the present disclosure, and FIG. 2 is a block diagram illustrating a probe vehicle 100 illustrated in FIG. 1. FIG. 3 is a block diagram illustrating a server 200 illustrated in FIG. 1.

Referring to FIG. 1, a traffic information providing system includes a probe vehicle 100 and a server 200 that exchange data with each other over a network. The network may be implemented with a wireless Internet network, a short range communication network, and/or a mobile communication network. The wireless Internet network may be implemented with Wireless LAN (WLAN) (Wi-Fi) and/or Wireless broadband (Wibro). The short range communication network may be implemented with Bluetooth, Near Field Communication (NFC), Radio Frequency Identification (RFID) and/or ZigBee. The mobile communication network may be implemented with Code Division Multiple Access (CDMA), Global System for Mobile communication (GSM), Long Term. Evolution (LTE), and/or International Mobile Telecommunication (IMT)-2020.

While driving on a road, the probe vehicle 100 may collect probe data (traffic information) such as a vehicle location, vehicle state information, and/or road information to transmit the probe data to the server 200. As illustrated in FIG. 2, the probe vehicle 100 includes a communicator 110, a positioning device 120, in-vehicle sensors 130, storage 140, an output device 150, and a controller 160.

The communicator 110 may communicate with the server 200. The communicator 110 may utilize a communication technology such as wireless Internet, short range communication, and/or mobile communication. The communicator 110 may perform wireless communication with another vehicle and/or another probe vehicle 100, using the technology of vehicle communication (Vehicle to Everything (V2X)). Vehicle to Vehicle (V2V), Vehicle to Infrastructure (V2I), and/or Vehicle-to-Nomadic Devices (V2N) may be applied to the technology of V2X.

The positioning device 120 measures the current location of a vehicle, that is, a vehicle location. The positioning device 120 may measure the vehicle location, using at least one or more of positioning technologies such as Global Positioning System (GPS), Dead Reckoning (DR), Differential GPS (DGPS), Carrier phase Differential GPS (CDGPS), and the like.

The in-vehicle sensors 130 may be mounted in a vehicle to obtain vehicle state information, road information, and/or surrounding situation information. The in-vehicle sensors 130 may include a vehicle speed sensor, an odometry, a steering angle sensor, an image sensor, Radio Detecting and Ranging (radar), Light Detection and Ranging (LiDAR), and/or an ultrasonic sensor.

The in-vehicle sensors 130 may store the sensed data in the storage 140 and may transmit the sensed data to the controller 160. For example, the in-vehicle sensors 130 may obtain the vehicle state information such as a vehicle speed and/or a mileage, may store the vehicle state information in the storage 140, and may transmit the vehicle state information to the controller 160.

The storage 140 may store software programmed such that the controller 160 performs a specified operation. The storage 140 may store navigation software and map data. The storage 140 may store sensing data obtained by the in-vehicle sensors 130. Moreover, the storage 140 may store the traffic information received from the communicator 110. The storage 140 may be implemented with at least one or more storage media (recording media) among a flash memory, a hard disk, a Secure Digital (SD) card, a Random Access Memory (RAM), a Read Only Memory (ROM), an Electrically Erasable and Programmable ROM (EEPROM), an Erasable and Programmable ROM (EPROM), a register, a removable disc, and the like.

The output device 150 may output various types of information in the form of visual information, auditory information, and/or tactile information. The output device 150 may output the progress and result according to the operation of the controller 160.

The output device 150 may include a display, an audio output module, and/or a haptic module. The display may include one or more of a liquid crystal display (LCD), a thin film transistor-liquid crystal display (TFT LCD), an organic light-emitting diode (OLED) display, a flexible display, a 3D display, a transparent display, head-up display (HUD), a touch screen, and a cluster. The audio output module plays and outputs audio data stored in the storage 140 and may be implemented with a speaker. The haptic module outputs a tactile signal (e.g., vibration) that the user may perceive with a tactile sense, by controlling the vibration intensity, the vibration pattern, and the like of a vibrator. Furthermore, the display may be implemented with a touch screen combined with a touch sensor and may be used as an input device as well as an output device.

The controller 160 controls the operation of the probe vehicle 100. The controller 160 may be implemented with at least one or more of an Application Specific Integrated Circuit (ASIC), a Digital Signal Processor (DSP), a Programmable Logic Devices (PLD), Field Programmable Gate Arrays (FPGAs), a Central Processing Unit (CPU), microcontrollers, and microprocessors.

The controller 160 may obtain a vehicle location through the positioning device 120, may map the obtained vehicle location to map data, and may identify link entry or link exit. The controller 160 may calculate a link speed at the time of link entry. The link speed refers to the average vehicle speed at which a vehicle is driving on a link (road section). The controller 160 may collect (obtain) the vehicle speed from the link entry time and may calculate the average vehicle speed, that is, the link speed, by using the vehicle speed collected at the link exit time, that is, the link pass time. Alternatively, the controller 160 may count a mileage and a driving time at the link entry time and may compute a link speed, using the mileage and the driving time counted at the link exit time.

The controller 160 may transmit (transfer) traffic information including the vehicle location and the link speed to the server 200 at the link pass time. The controller 160 may transmit the vehicle location to the server 200 at the preset transmission period.

The server 200 collects probe data (i.e., traffic information) transmitted from the at least one or more probe vehicles 100. The server 200 may generate traffic pattern information based on the precollected traffic information, i.e., past traffic information, may store the traffic pattern information in a database (DB), and may manage the traffic pattern information. The server 200 may predict real-time traffic information, using the traffic pattern information and may transmit the predicted real-time traffic information to one or more other vehicles. As illustrated in FIG. 3, the server 200 may include a communicator 210, a memory 220, and a processor 230.

The communicator 210 may communicate with the probe vehicle 100 and/or other vehicles. The communicator 210 may utilize a communication technology such as wired Internet, wireless Internet, short range communication, and/or mobile communication. Local Area Network (LAN), Wide Area Network (WAN), Ethernet, and/or Integrated Services Digital Network (ISDN) may be used as the wired Internet technology.

The memory 220 may store a program for the operation of the processor 230 and may store preset setting information. The memory 220 may store an algorithm for generating the traffic pattern information. The memory 220 may be implemented with at least one or more storage media (recording media) among a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disc, and the like.

The processor 230 controls the overall operation of the server 200. The processor 230 may include at least one or more of an Application Specific Integrated Circuit (ASIC), a Digital Signal Processor (DSP), a Programmable Logic Devices (PLD), Field Programmable Gate Arrays (FPGAs), a Central Processing Unit (CPU), microcontrollers, and microprocessors.

The processor 230 collects the probe data (traffic information) transmitted from the probe vehicle 100 through the communicator 210 to store the probe data in the DB. That is, the past traffic information (precollected traffic information) collected by the probe vehicle 100 is stored in the DB. The past traffic information refers to traffic information generated based on the link pass time (link exit time). The past traffic information may include the past link exit time and the past link speed (past link driving speed) for each link.

The processor 230 may again process the past traffic information based on the link entry time to generate the traffic pattern information. In more detail, the processor 230 extracts the past link speed generated at the link exit time, from the past traffic information. The processor 230 calculates the past link driving time based on the past link speed. The processor 230 may compute the past link entry time, using the past link driving time. The processor 230 again process the past traffic information based on the link entry time to generate the traffic pattern information. The processor 230 may store and manage the generated traffic pattern information in the DB. The traffic pattern information may include the pattern link entry time, the pattern link exit time, the pattern link speed, and the like for each link.

The processor 230 may receive the real-time link exit time and the real-time link speed from the probe vehicle 100. The probe vehicle 100 calculates the real-time link speed at the time of link pass (exit) to transmit the real-time link speed to the server 200.

The processor 230 calculates (computes) the link driving time, using the real-time link speed. The processor 230 calculates the real-time link entry time based on the link driving time and the real-time link exit time.

The processor 230 matches the real-time link exit time to the traffic pattern information to extract the past link speed and calculates the speed difference between the real-time link speed and the past link speed. For example, the processor 230 calculates a value, which is obtained by subtracting the past link speed from the real-time link speed, that is, the speed difference ΔV.

The processor 230 corrects the pattern link speed based on the real-time link entry time. In other words, the processor 230 matches the real-time link entry time to the traffic pattern information to extract the pattern link speed. The processor 230 corrects the pattern link speed based on the real-time link entry time by summing the pattern link speed and the speed difference and then calculates the real-time link speed of the real-time link entry time (time point). That is, the processor 230 corrects the traffic pattern information by reflecting the speed difference and the real-time link entry time.

The processor 230 generates the real-time traffic information based on the corrected traffic pattern information. The processor 230 corrects the real-time link speed by reflecting the corrected pattern link speed.

Also, when a congestion prediction condition is satisfied, the processor 230 may predict and reflect the congestion situation of the following road section in advance when heavy congestion occurs in the preceding road section (link). To this end, the processor 230 may determine whether a lane link, in which the speed is not greater than a first reference speed (e.g., 5 kph), in a link set for each lane is present. For example, the processor 230 determines whether the lane link, in which the speed is not greater than 5 kph, among the first lane link, the second lane link, the third lane link, and the fourth lane link is present, when the first lane link, the second lane link, the third lane link, and the fourth lane link are present in the same link (road section). The processor 230 determines whether the speed of the lane link within the following road section connected to the lane link in which the speed is not greater than a first reference speed is not less than a second reference speed (e.g., 10 kph) and whether the difference between the lowest link speed and the highest link speed of the lane link in the following road section is not less than a third reference speed (e.g., 20 kph) within a specified time (e.g., one hour) from the current time. The processor 230 matches the current time to the traffic pattern information to reflect the lowest link speed among pattern link speeds within one hour from the current time, as the link speed of the following road section when the difference between the lowest link speed and the highest link speed is not less than the third reference speed.

Figure 4:
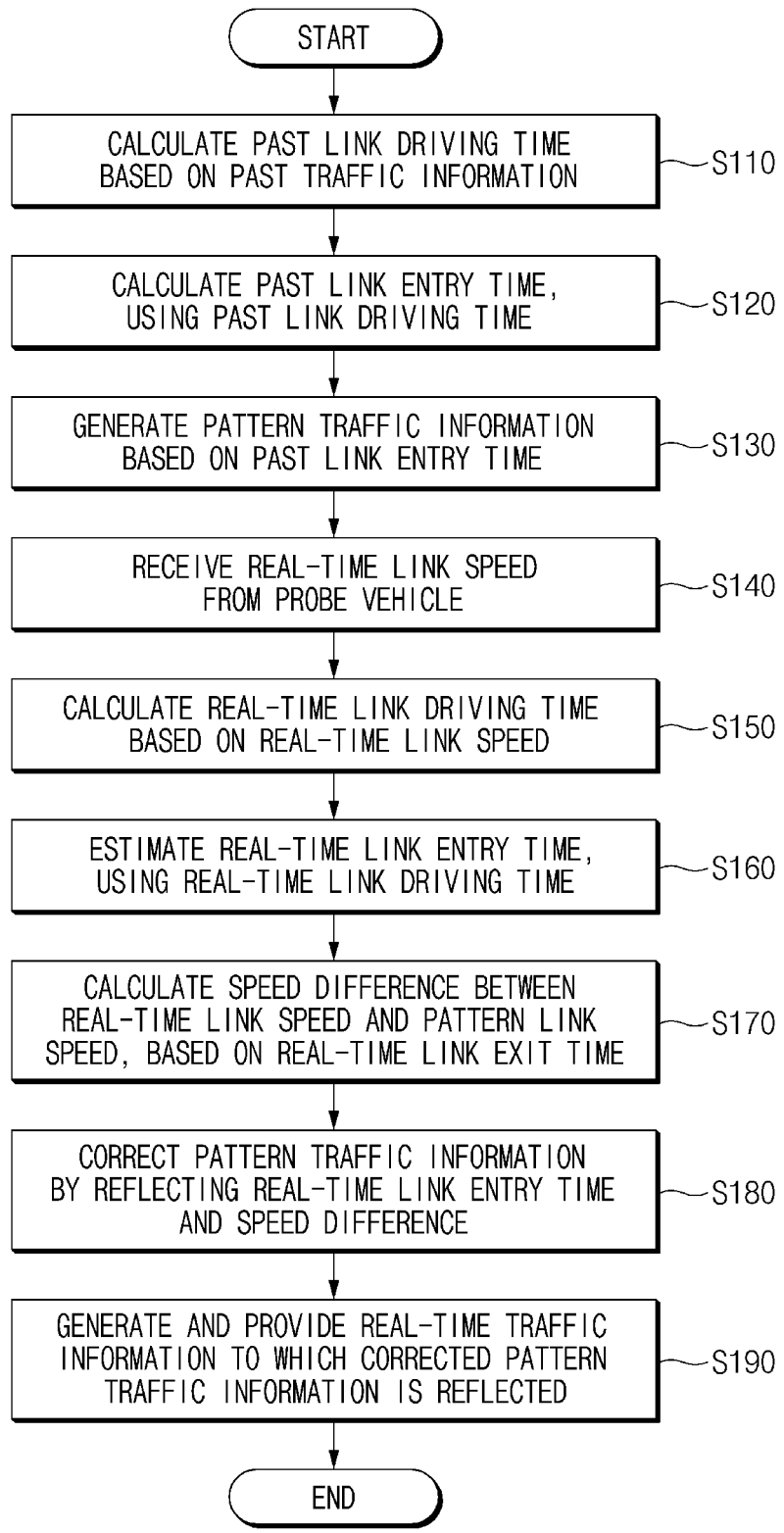
FIG. 4 is a flowchart illustrating a traffic information providing method.

FIG. 4 is a flowchart illustrating a traffic information providing method, according to one form of the present disclosure.

Referring to FIG. 4, in S110, the server 200 calculates a past link driving time based on past traffic information stored in a database (hereinafter, referred to as a "DB"). The past traffic information includes a link speed at the link exit time for each link, as traffic information generated based on a link exit (pass) time.

In S120, the server 200 calculates a past link entry time, using the past link driving time. In other words, the server 200 computes the past link entry time by subtracting the past link driving time from the past link exit time.

In S130, the server 200 generates the traffic pattern information based on the past link entry time. The server 200 again processes the past traffic information generated based on the past link exit time, based on the past link entry time to generate the traffic pattern information. The server 200 stores and manages the generated traffic pattern information in the DB.

Afterward, in S140, the server 200 receives a real-time link speed from the probe vehicle 100. The probe vehicle 100 transmits the real-time link speed to the server 200 at the time of passing through (exiting from) a link. At this time, the probe vehicle 100 may transmit the real-time link exit time together with the real-time link speed.

In S150, the server 200 calculates the real-time link driving time based on the real-time link speed. The server 200 may compute the real-time link driving time, using the real-time link speed and a link length (mileage).

In S160, the server 200 estimates a real-time link entry time, using the real-time link driving time. The server 200 may calculate the real-time link entry time, using the real-time link exit time and the real-time link driving time.

In S170, the server 200 calculates the speed difference between the real-time link speed and the pattern link speed, based on the real-time link exit time. The server 200 matches the real-time link exit time to the traffic pattern information to extract the pattern link speed of the past link exit time. The server 200 computes the speed difference obtained by subtracting the pattern link speed from the real-time link speed.

In S180, the server 200 corrects the traffic pattern information by reflecting the real-time link entry time and the speed difference. The server 200 corrects the traffic pattern information by reflecting the speed difference based on the real-time link entry time.

In S190, the server 200 generates and provides the real-time traffic information to which the corrected traffic pattern information is reflected. The server 200 corrects the link speed of the real-time link entry time (time point) in consideration of the corrected traffic pattern information.

Figure 5:
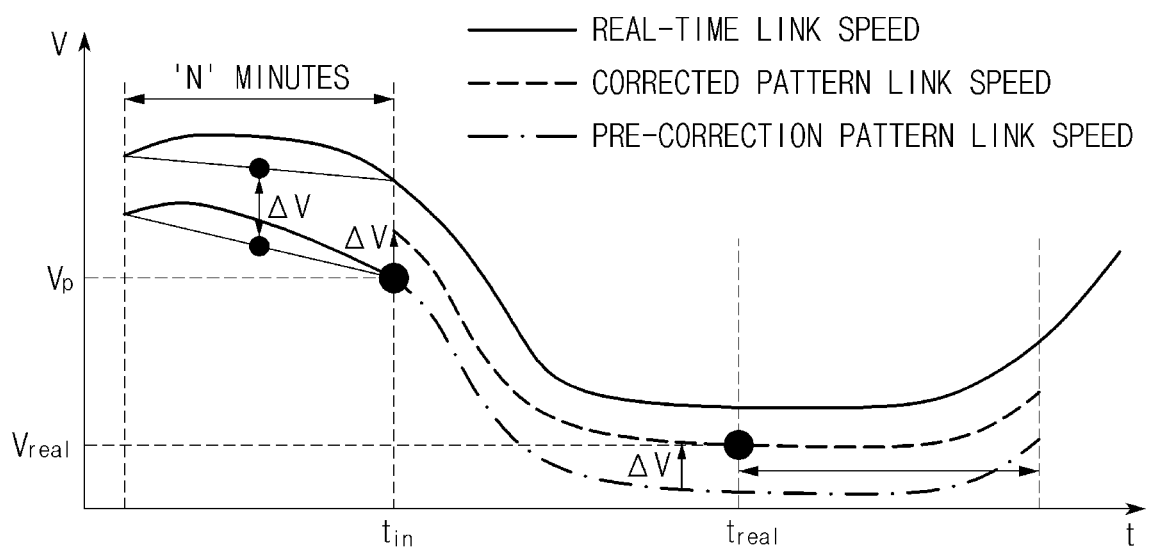
FIG. 5 is a view for describing an example of correcting traffic pattern information.

FIG. 5 is a view for describing an example of correcting traffic pattern information, according to one form of the present disclosure.

As illustrated in FIG. 5, the server 200 collects a real-time link exit time (current time) $t_{real}$ and a real-time link speed through the probe vehicle 100. The server 200 calculates a real-time link driving time, using the real-time link speed and a link length. The server 200 estimates a real-time link entry time $t_{in}$ by shifting the real-time link exit time treat by the real-time link driving time. That is, the server 200 estimates that the probe vehicle 100 enters a link at $t_{in}$ and then exits from (passes through) the link at $t_{real}$.

The server 200 calculates the speed difference ΔV between the real-time link speed and the pattern link speed by comparing the real-time link speed and the pattern link speed during the preset time (n minutes). At this time, the server 200 calculates averages of the real-time link speed and the pattern link speed during 'n' minutes before the real-time link entry $t_{in}$ and compares the average of the real-time link speed with the average of the pattern link speed. At this time, the server 200 may match the real-time link exit time, at which the real-time link speed is generated, to the traffic pattern information to extract the pattern link speed.

In the meantime, the server 200 may calculate the speed difference ΔV, using the pattern link speed extracted by matching the real-time link speed at the real-time link exit time $t_{real}$ and the real-time link exit time $t_{real}$ to the traffic pattern information.

The server 200 matches the real-time link entry time $t_{in}$ to the traffic pattern information to extract a pattern link speed $V_p$ and then calculates the pattern link speed corresponding to the real-time link entry time $t_{in}$ by reflecting the speed difference ΔV to the extracted pattern link speed $V_p$. The server 200 shifts the pattern link speed (i.e., traffic pattern information) after the real-time link entry time $t_{in}$ by the speed difference ΔV and then corrects the pattern link speed.

The server 200 corrects the real-time link speed of the real-time link exit time $t_{real}$, based on the corrected traffic pattern information. That is, the server 200 corrects the link speed generated at the real-time link exit time $t_{real}$, based on the corrected traffic pattern information to generate the real-time link speed $V_{real}$. That is, the server 200 may provide another vehicle, which desires to enter the corresponding link at the real-time link exit time of the probe vehicle 100, with the real-time link speed $V_{real}$ at a point in time when the probe vehicle 100 exits from the link in real time, as the real-time link speed. Because the other vehicle may determine whether congestion occurs in a link, based on the real-time link speed before link entry, the other vehicle may avoid the corresponding link when the congestion occurs in the link.

Figure 6:
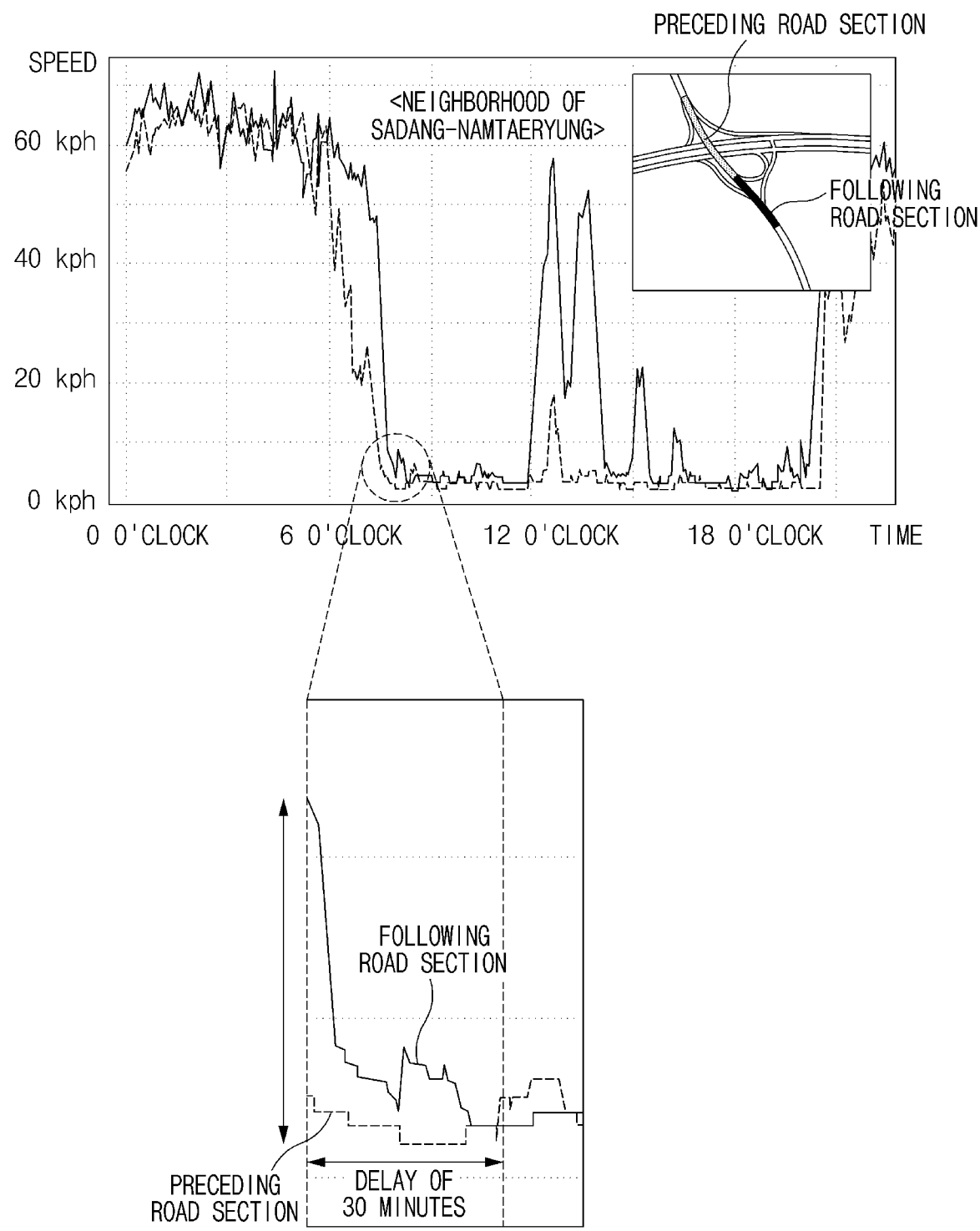
FIGS. 6 to 8 are exemplary views illustrating an example in which congestion of a preceding road section associated with the present disclosure is spread in a following road section.
Figure 7:
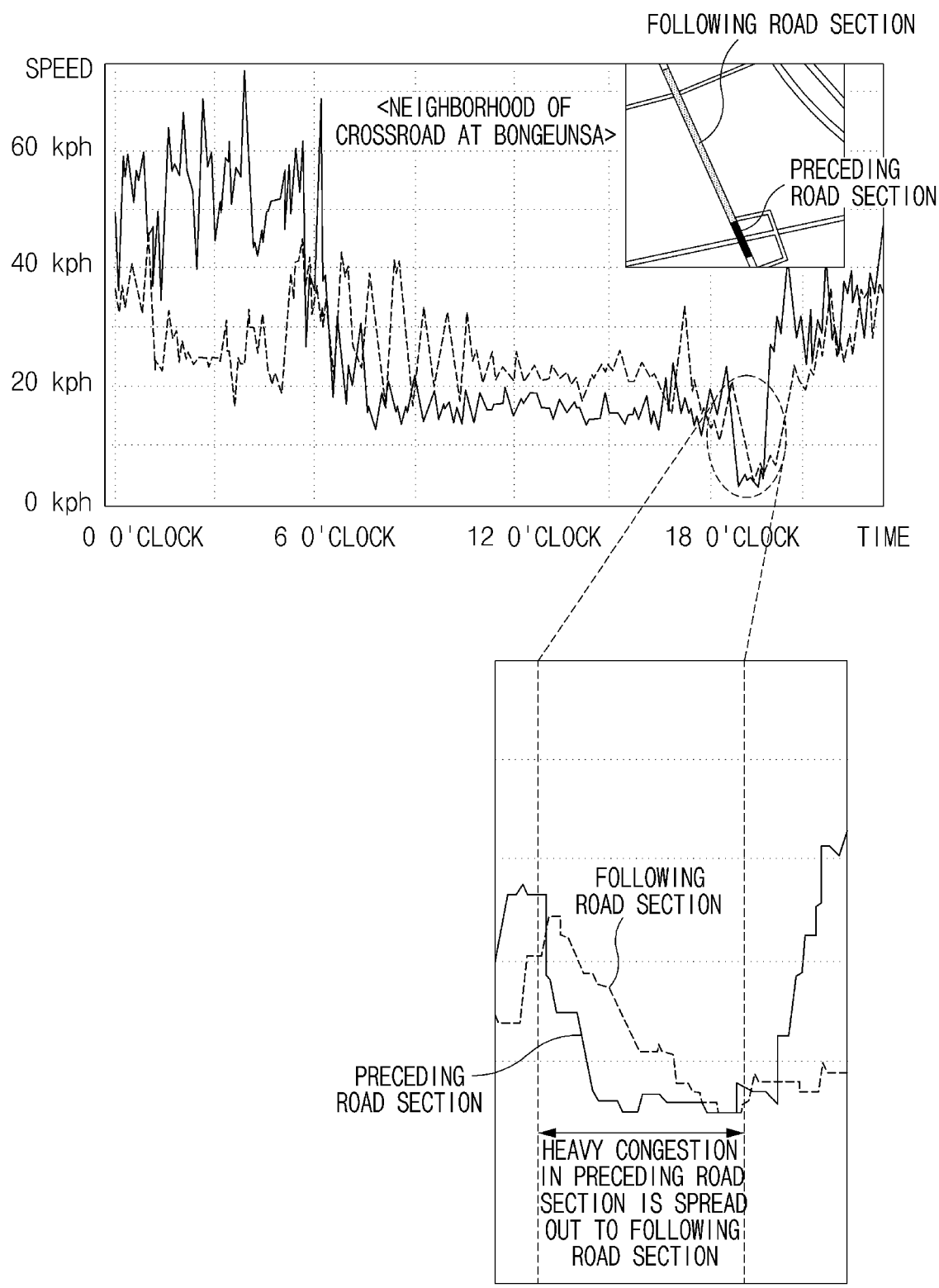
Figure 8:
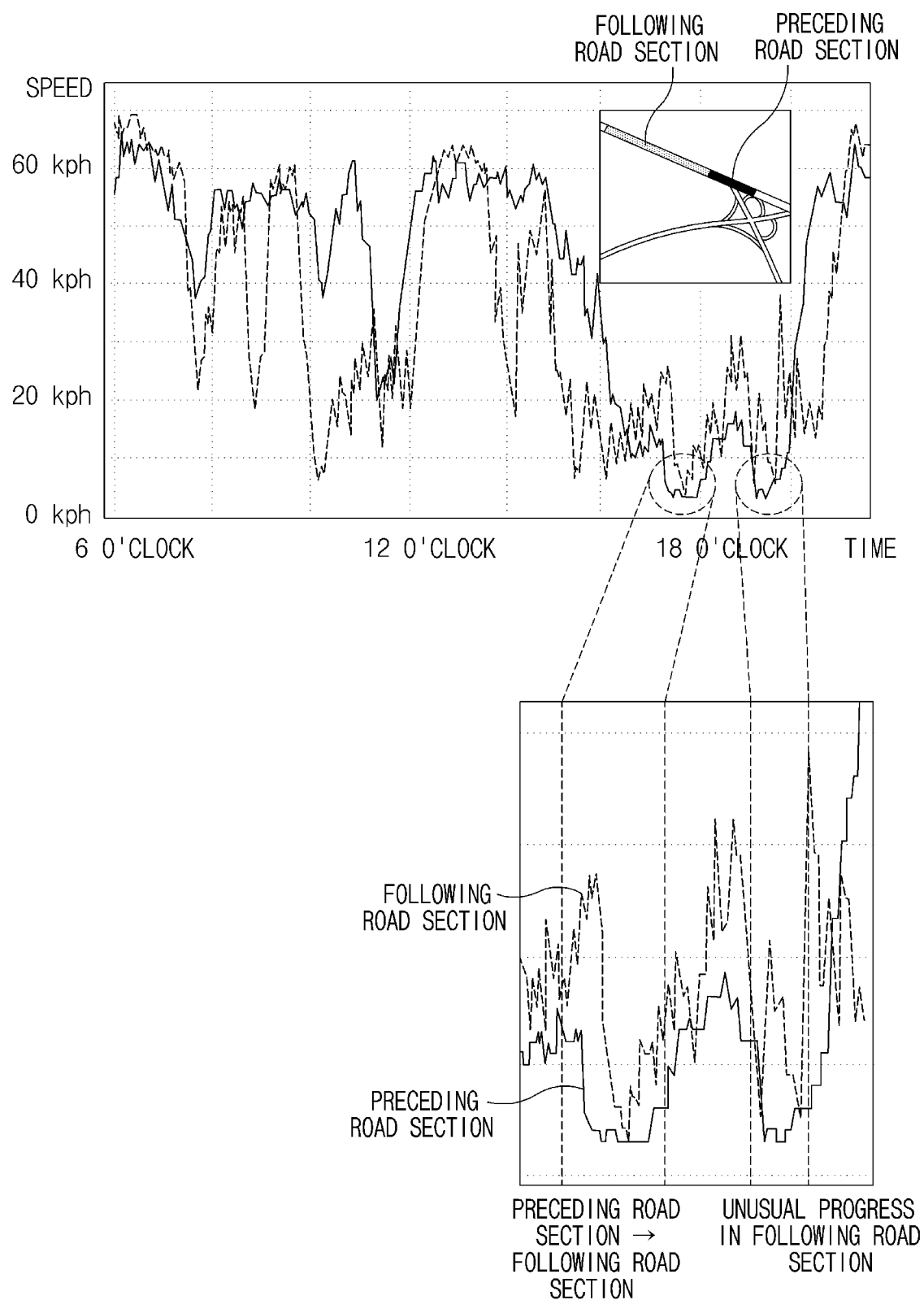

FIGS. 6 to 8 are exemplary views illustrating an example in which congestion of a preceding road section associated with the present disclosure is spread in a following road section.

Referring to FIGS. 6 and 7, congestion occurs in the following road section connected to the preceding road section due to the delay by a specific time (e.g., 30 minutes) from a point in time when the congestion occurs in the preceding road section, when the heavy congestion occurs in a preceding road section (link). That is, the congestion that occurs in the preceding road section may be spread out with a time lag to the following road section connected to the preceding road section. Alternatively, as illustrated in FIG. 8, heavy congestion in the preceding road section may spread out to the following road section. At the same time, the heavy congestion may be spread out in the unusual form in which traffic congestion and traffic smooth are mixed in the following road section.

In this case, the server 200 may select a lane link, of which the link speed is not greater than a first reference speed in a link for each lane in the preceding road section; then, the server 200 may reflect the lowest link speed among pattern link speeds to the link speed of the following road section within the predetermined time in advance and may predict congestion conditions in the following road section in advance, when the link speed of the lane link in the following road section connected to the selected lane link is not less than a second reference speed and when the difference between the lowest link speed and the highest link speed of the lane link in the following road section is not less than a third reference speed within the predetermined time from the current time.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

According to the exemplary forms of the present disclosure, it is possible to rapidly detect congestion in a link because real-time traffic information is generated based on the link entry time by using traffic pattern information based on precollected traffic information.

Furthermore, because the real-time traffic information of a following link is provided by reflecting traffic conditions of a preceding link, it is possible to improve the quality of the congestion avoidance path by quickly recognizing a situation in which the congestion suddenly occurs in the link.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A traffic information providing system, the system comprising:
   a database configured to store and manage traffic pattern information based on past traffic information; and
   a server including a memory and a processor configured to execute instructions stored in the memory, the processor configured to:
   compute a real-time link entry time based on a real-time link speed received from a probe vehicle;
   calculate a real-time link driving time, using the real-time link speed, and compute the real-time link entry time based on a real-time link exit time and the real-time link driving time;
   extract a pattern link speed by matching the real-time link exit time to the traffic pattern information;
   compute a speed difference between the real-time link speed and the pattern link speed;
   correct the traffic pattern information based on the real-time link entry time and the speed difference; and
   predict and provide real-time traffic information based on the corrected traffic pattern information.

2. The system of claim 1, wherein the server is configured to:
   calculate a past link driving time based on a past link speed in the past traffic information, compute a past link entry time, using the past link driving time, and reprocess the past traffic information based on the past link entry time to generate the traffic pattern information.

3. The system of claim 2, wherein the past traffic information is generated based on probe data precollected through the probe vehicle.

4. The system of claim 1, wherein the server is configured to match the real-time link entry time to the traffic pattern information, and extract the pattern link speed after a pattern link entry time to reflect the speed difference.

5. The system of claim 1, wherein the server is configured to:
   select a lane link, of which a link speed in a link set for each lane in a preceding road section is not greater than a first reference speed,
   determine whether a link speed of a lane link in a following road section connected to the selected lane link is not less than a second reference speed, and
   determine whether a difference between a lowest link speed and a highest link speed of the lane link in the following road section is not less than a third reference speed within a predetermined time based on a current time, when the link speed of the lane link in the following road section is not less than the second reference speed.

6. The system of claim 5, wherein the server is configured to match the current time to the traffic pattern information to reflect a lowest pattern link speed among pattern link speeds within the predetermined time based on the current time, to a link speed of the following road section in advance, when a difference between the lowest link speed and the highest link speed of the lane link in the following road section is not less than the third reference speed.

7. A traffic information providing method, the method comprising:
   generating, by a processor, traffic pattern information based on past traffic information;
   receiving a real-time link speed from a probe vehicle;
   computing, by the processor, a real-time link entry time based on the real-time link speed, wherein computing the real-time link entry time includes:
      calculating a real-time link driving time based on the real-time link speed, and
      estimating the real-time link entry time, using the real-time link driving time and a real-time link exit time;
   extracting, by the processor, a pattern link speed by matching the real-time link exit time to the traffic pattern information;
   calculating, by the processor, a speed difference by subtracting the pattern link speed from the real-time link speed;
   correcting, by the processor, the traffic pattern information based on the real-time link entry time and the speed difference; and
   predicting and providing, by the processor, real-time traffic information based on the corrected traffic pattern information.

8. The method of claim 7, wherein generating the traffic pattern information includes:
   calculating, by the processor, a past link driving time, using a past link speed in the past traffic information;
   calculating, by the processor, a past link entry time by utilizing the past link driving time; and
   reprocessing, by the processor, the past traffic information based on the past link entry time to generate the traffic pattern information.

9. The method of claim 7, wherein correcting the traffic pattern information by reflecting the real-time link entry time and the speed difference includes:
   extracting the pattern link speed matched to the real-time link entry time, from the traffic pattern information;
   calculating a link speed of the real-time link entry time by reflecting the speed difference to the extracted pattern link speed; and
   generating the real-time traffic information by reflecting the calculated link speed to the real-time link speed.

* * * * *